April 24, 1934.  W. C. KLEIN  1,956,195
CUSHION CAR WHEEL
Filed Jan. 26, 1933  2 Sheets-Sheet 1
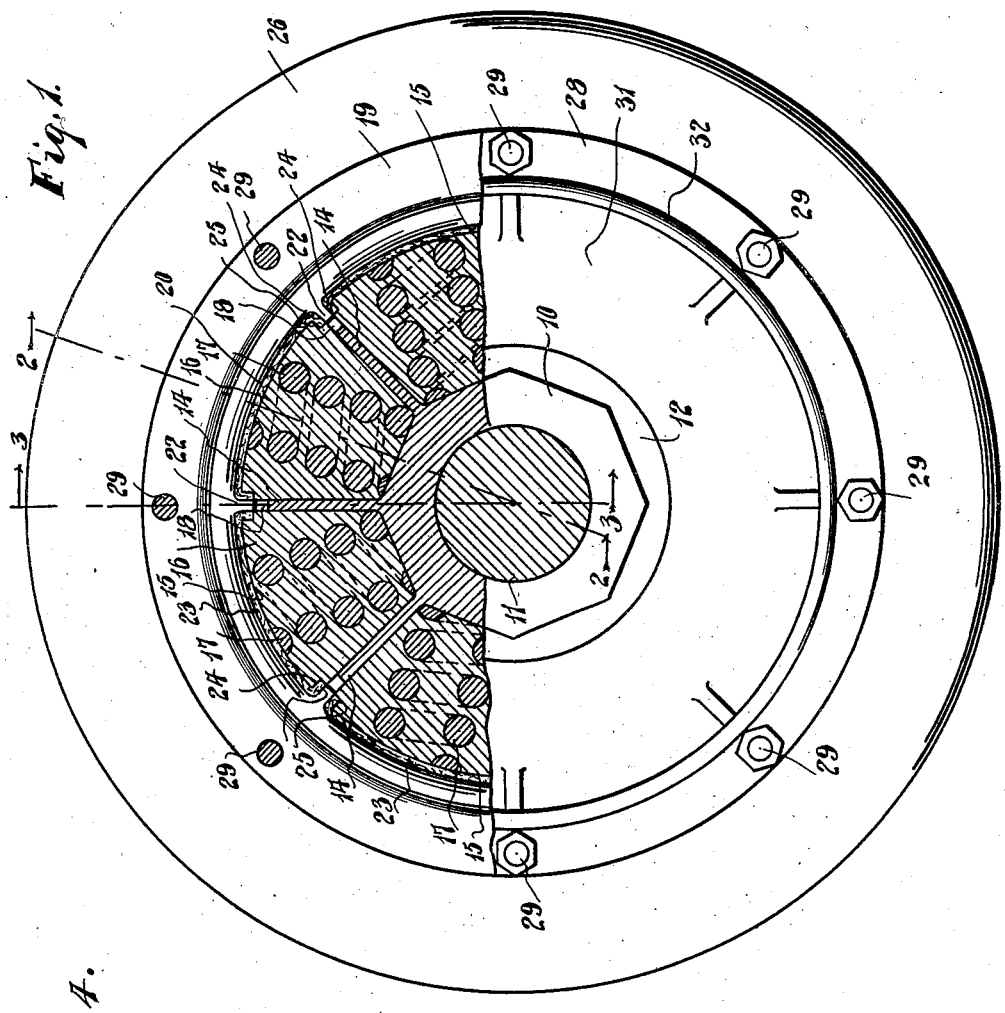
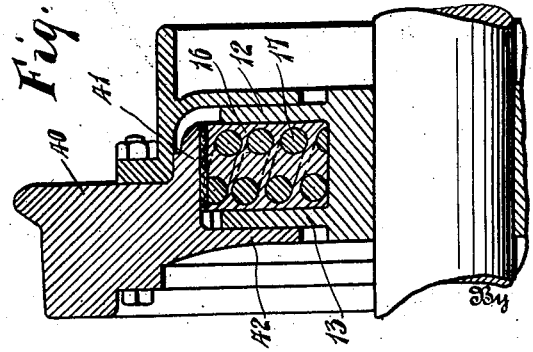
Inventor
W. C. Klein,
Attorney April 24, 1934.  W. C. KLEIN  1,956,195
CUSHION CAR WHEEL
Filed Jan. 26, 1933  2 Sheets-Sheet 2
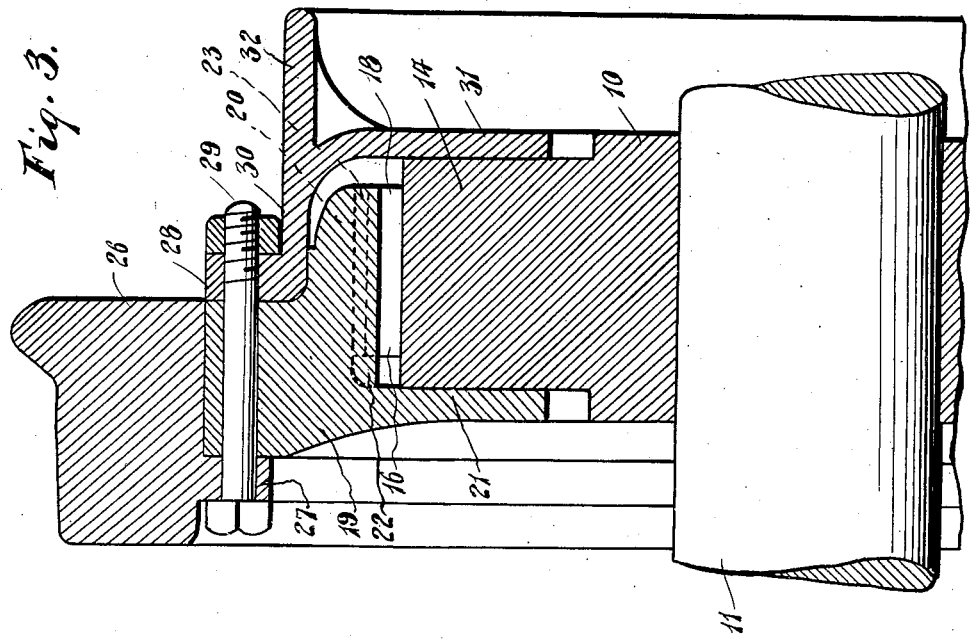
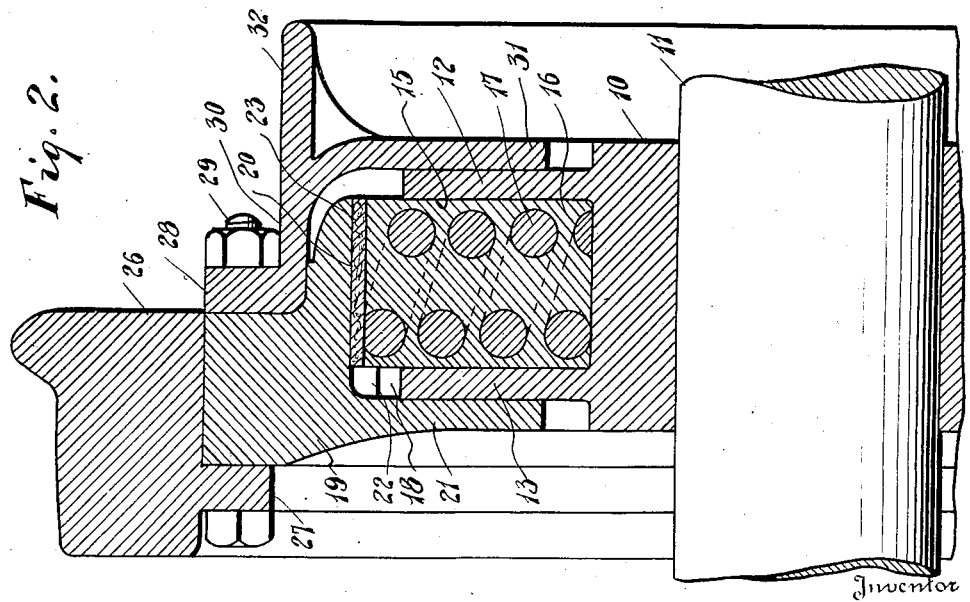
Inventor
W. C. Klein.

Patented Apr. 24, 1934

1,956,195

UNITED STATES PATENT OFFICE 1,956,195

CUSHION CAR WHEEL

William C. Klein, Allentown, Pa.

Application January 26, 1933, Serial No. 653,695

1 Claim. (Cl. 152—43)

The invention relates to vehicle wheels, and particularly wheels adapted for use on railroad cars, and has for its principal object the provision of a wheel provided with cushioning means to absorb the shock incident to operation of the car or vehicle, and also to deaden the noise of operation of running the wheel over the railroad tracks.

The invention will be described in detail hereinafter and will be found illustrated in the accompanying drawings, in which Figure 1 is a view in elevation of the improved car wheel, partly broken away, and in section, Figure 2 is a fragmentary sectional view on an enlarged scale on a plane indicated by the line 2—2 of Figure 1, Figure 3 is a similar view on a plane indicated by the line 3—3 of Figure 1, and Figure 4 is a fragmentary sectional view of a slightly modified construction of the wheel.

In the drawings similar reference characters are used to designate corresponding parts in all the views.

The car wheel has a hub section 10 that is shown mounted on an axle 11. 12 and 13 are spaced peripheral walls extending outwardly from the hub 10, and 14 partitions connecting the said walls 12 and 13, and forming therewith recesses 15 in which are mounted cushion elements comprising rubber bodies 16 in which are encased expansible coil springs 17 that reinforce the rubber bodies or blocks 16 and also add to the resiliency thereof. It will be apparent that any suitable resilient body may be substituted for the rubber, and that two or more springs may be provided instead of the single coil spring as shown. The cushion elements extend outside of the outer edges of the walls 12 and 13 and the partitions 14, as shown, and provide spaces 18 therebetween.

Mounted on the cushion element is a ring 19 having a shoulder 20 supported by said cushion elements and an inwardly directed flange 21 that slidably engages the wall 13. Extending inwardly from the shoulder 20 are transverse fins 22 that engage between the cushion elements and are movably mounted in the spaces 18 therebetween so that during the operation of the wheel the ring 19 may move relatively to the hub 10 under restraint of the cushion elements to cushion the action of the wheel in traveling over the rails or other surface. To protect the cushion elements from the heat generated by operation of the wheel there are provided strips of asbestos packing 23 that are interposed between the shoulder 20 and the cushion elements, the ends of said packing members being bent inwardly and arranged on opposite sides of the fins 22 as shown at 24, said ends 24 being accommodated by recesses 25 in the rubber body 16. 26 is the tread rim of the wheel and is provided with an inwardly extending flange 27 engaging the front face of the ring 19.

28 indicates the clamping ring that is secured to the ring 19 and flange 27 by means of threaded fastening members 29 and is provided with outwardly and inwardly extending portions 30 and 31, the inwardly extending portion slidably engaging against the wall 12. 32 indicates an annular lip extending from the part 30 to provide means for application of a brake band or brake shoes.

In manufacturing the car wheel the preferred form is that shown in Figures 1, 2, and 3, in which the tread rim is separate from the ring 19 and is preferably shrunk thereon in addition to being secured thereto by means of the threaded fastenings 29, but it will be apparent that the tread rim may be cast integral with the ring 19 as shown in Figure 4, wherein the tread portion is designated 40 and has a shoulder 41 that engages the cushion members 16, 17, and an inwardly extending flange 42 that slidably engages the wall 13, the remainder of the structure being identical with Figures 1, 2, and 3, and the same reference characters are used in connection therewith to indicate corresponding parts.

What is claimed is:—

A vehicle wheel, comprising a hub section, spaced circumferential walls on said hub section, partitions connecting said walls providing recesses surrounding the hub, blocks of resilient material mounted in said recesses and projecting beyond the outer edges of the walls and partitions, the projecting portions of said blocks being spaced apart to provide transverse spaces therebetween, a tread section formed of separable portions, an inwardly extending flange on each of said portions and slidably engaging the outer faces of said circumferential walls, transverse flanges on one of said tread portions engaging in the transverse spaces between said blocks, and means securing the tread portions together.

WILLIAM C. KLEIN.